United States Patent Office 2,914,443
Patented Nov. 24, 1959

2,914,443

OINTMENT

Matthew J. Lynch, Waukegan, Ill., assignor to Abbott Laboratories, North Chicago, Ill., a corporation of Illinois No Drawing. Application March 31, 1958
Serial No. 724,933

15 Claims. (Cl. 167—63)

This invention relates to an ointment base or vehicle, to a new ointment composition containing a drug, and to a method for making such base and composition.

In the medical art it has long been recognized that many drugs are unstable in the presence of water and are, therefore, unsuitable for administration from a vehicle which contains water. This knowledge has caused a shift to the use of oleaginous vehicles and bases such as mineral oil and petrolatum. These materials are usually called ointment bases and they too have serious defects which are well recognized in the art. If the oleaginous ointment is composed essentially of petrolatum or mineral oil it is difficult to wash from the skin at the conclusion of treatment, and of course is not easily removable from areas where soap and abrasive action cannot be employed. On the other hand, if an agent is added to render the ointment soluble or miscible it becomes too readily miscible with aqueous media and does not hold the medicament in place for a sufficiently long period of time.

The foregoing is true, for example, of a mastitis ointment preparation in which it is desirable to retain the medicament at the site of the infection for a considerable length of time, and yet to wash it out rapidly when medication has been completed. A petrolatum or mineral oil vehicle coats the interior walls of the teat canal and udder and being highly immiscible with milk will remain in place for several days after the treatment is completed and small amounts of medicament will be found in the milk throughout this period of time. It is possible, of course, to include an emulsifying agent with the mineral oil in the mastitis preparation but in such case the preparation will be washed out by the flow of milk before the desired length of treatment with the medicament has been accomplished.

As another example the thiobarbiturates are found to be unstable in water and must be put up in the form of a dry powder to be dissolved in water just prior to use. Aqueous solutions of thiobarbiturates are known for rectal installation. While this route of administration is recognized as being desirable it is not without severe difficulties, such as premature evacuation, leaking and irritation.

It is therefore a principal object of this invention to provide an ointment base in which miscibility of the oleaginous vehicle with water may be limited and controlled.

Another object of the invention is to provide an ointment base which is not adversely affected by extremes of temperature.

A further object of the invention is to provide a method for preparing an ointment base in which the miscibility with water may be controlled or limited within predescribed limits.

A still further object of the invention is to provide an ointment which will hold a medicament in place in spite of flowing aqueous liquid but which will be washed away within an allotted time.

A further object of the invention is to provide a method of administering a thiobarbiturate in a convenient and accurate dosage form in which the drug will be stable and readily absorbed in the bowel.

Still another object of the invention is to provide a new, stable dosage form of the thiobarbiturates.

In the accomplishment of the foregoing objects and in accordance with the practice of the invention there is now provided an ointment base or vehicle which is characterized by controlled or limited miscibility with water. That is, the ointment base or vehicle is one which is miscible with aqueous liquid at a rate which can be predetermined by the addition of portions of certain ingredients used to make up the ointment base. The ointment base to which the invention pertains comprises a major proportion of an oil, a substantially water non-dispersible gel forming agent and a mineral oil soluble polyoxyethylene sorbitan monooleate.

The term "ointment" is used herein to define a preparation containing a liquid fat (oil) and used primarily as a carrier or vehicle for a drug. It is used topically, on the skin or mucous membrane, even though often described herein as being "injected" by rectum into the bowel, or "injected" into the teat canal and udder of an animal.

The oil referred to above is preferably a mineral oil but the term also includes the soft petrolatum type hydrocarbons. The viscosity of the oil is not a critical feature and mineral oil of high and low viscosity may be employed but mineral oil of medium viscosity is preferred. Vegetable oils may also be employed, such as corn oil, sesame oil and highly refined soy bean oil.

The preferred gel forming agent which has been previously referred to as one which is substantially water non-dispersible, is an alkyl substituted ammonium bentonite such as dimethyldioctadecyl ammonium bentonite which is marketed under the trade name Bentone 34 by the National Lead Company. It will be apparent that other alkyl groups having from 12 to 18 carbons may be substituted for the methyl and octadecyl radicals. This material, in contrast to all other commonly known bentonites is, substantially non-dispersible in water and is not readily wet by water. It is used in this invention in amounts ranging between about 0.1% and about 10% by weight.

The mineral oil soluble polyoxyethylene sorbitan monooleate referred to herein is an oily liquid having a viscosity between about 350 and 550 centipoises at 25° C. and is marketed by Atlas Powder Company under the trade name Tween 81. It is used in amounts ranging upward from about 2% by weight. The upper limit is not critical and is governed only by economics and the physical property of the base.

The use of all the ingredients previously described is necessary in the preparation of a suitable ointment base which will have a controlled miscibility in water. For example, if only the mineral oil soluble polyoxyethylene sorbitan monooleate is used with medium viscosity mineral oil, the product is readily miscible with water and will wash away quickly when any aqueous liquid comes in contact therewith. Drugs suspended in such an ointment base will not remain suspended for any suitable length of time and of course will be removed from the desired site rapidly if any aqueous liquid is brought into contact therewith. In a mastitis preparation for example, a product which contains only mineral oil and the polyoxyethylene sorbitan monooleate will be washed away by the milk in the udder and teat canal before the medicament will have a chance to attack the infection.

If, on the other hand, only the substantially water non-dispersible, alkyl substituted ammonium bentonite gel forming agent is used in conjunction with medium viscosity mineral oil in the preparation of an ointment base, the preparation will be substantially immiscible with water and cannot be washed away in a reasonable length of time. In a mastitis preparation of this type the medicament would not be washed away within the prescribed period and would tend to show up in milk for several days after the treatment has been concluded. Since milk thus contaminated should not be used it will be seen that there is an economic loss due to the failure of the ointment base to be washed away readily at the end of the treatment.

In the practice of this invention, however, a very satisfactory ointment base or vehicle is prepared by carefully combining the proper proportions of mineral oil, the alkyl substituted ammonium bentonite and the mineral oil soluble polyoxyethylene sorbitan monooleate. A preparation which contains a major proportion of medium viscosity mineral oil and from 0.1% to 10% by weight of an alkyl substituted ammonium bentonite gel forming agent such as dimethyldioctadecyl ammonium bentonite, and preferably about 5% by weight of the modified bentonite, and containing also at least about 2% by weight of the polyoxyethylene sorbitan monooleate, and preferably about 2½% by weight of said material, will provide an ointment base which will have a controlled miscibility with an aqueous liquid. A mastitis preparation of this type will hold a medicament at the site of the infection for a considerable length of time up to 48 hours and it will be washed away within 72 hours so that no significant amount of drug will be present in the milk after that length of time has passed.

Any suitable drug or medicament may be employed as the active ingredient in an ointment of the type described herein and there may be used for example, penicillin, erythromycin, streptomycin, neomycin, bacitracin or any of the other commonly prescribed antibiotics. In addition it is known to use the sulfa drugs for this type of preparation and there may be used sulfathiazole, sulfamerazine, sulfadiazine, sulfamethazine and other members of the related series. Many other strong antimicrobials and antiseptics are known and are suitable for use in this type of preparation. There may be named, for example, 5-nitro-2-furaldehydesemicarbazone and the 9-alkoxyphenyl acridines. The barbiturates and thiobarbiturates are also suitable. In fact, in one aspect of this invention there is included within the term "drug" any substance that is capable of being absorbed through the mucous membrane to give a phermacologic response. In another aspect any drug that is topically effective is included herein.

Another important advantage of this invention resides in the fact that the ointment base or vehicle prepared according to the practice of this invention is substantially unaffected by exposure to the range of temperatures normally encountered in the medical and veterinarian arts. By this is meant that the ointment base remains fluid at temperatures to 0° C. and may be readily expressed from a tube containing said ointment. At temperatures up to 40° C. the preparation retains its gel-like properties and the medicament and the substituted bentonite remain uniformly suspended therein. In addition, over this range of temperatures the drugs retain their potency for a long period of time in the ointment base of this invention.

In the accomplishment of the foregoing objects and also in accordance with the practice of this invention, there is also now provided a new method of administering a thiobarbiturate by the rectal route in a convenient and painless manner. The invention is practiced by compounding a water-soluble salt of a thiobarbiturate acid with the fluid, anhydrous ointment vehicle or base just described and characterized by controlled or limited water miscibility. The ointment base comprises a major proportion of an oil, a substantially water non-dispersible gel forming agent and a mineral oil soluble polyoxyethylene sorbitan monooleate. The thiobarbiturates most frequently used for producing anesthesia are those known by the generic names thiopental (5-ethyl-5-(1-methylbutyl)-2-thiobarbituric acid) and thiamylal (5-allyl-5-(1-methylbutyl)-2-thiobarbituric acid).

The dosage form just described is used according to the invention by administering an indicated dose to a human host by the rectal route. This method is convenient in that preparation of the patient is eliminated or reduced to a minimum and the administration is quite simple. No pain is involved to create anxiety in the patient and the complication of evacuation is reduced. The size of the dose may be adjusted at will simply by determining a suitable calculated dose and measuring the amount of ointment containing the calculated dose of thiobarbiturate.

The ointment has another very important advantage in that the thiobarbiturates used therein are notably stable under conditions of storage. The instability of the thiobarbiturates has always been a problem because they are destroyed by moisture and contact with other chemicals in the presence of moisture. In the case of the anhydrous ointment, the thiobarbiturates will remain stable over a long period of time.

The ointment base or vehicle is one which is miscible with aqueous liquid at a rate which can be predetermined by the addition of portions of certain ingredients used to make up the ointment base. In combination with a suitable dose of a water-soluble salt of a thiobarbituric acid, the composition is a gel-like mass of high viscosity. It does not flow readily when poured but it may be expelled rapidly from a syringe.

A preparation which contains a major proportion of medium viscosity mineral oil and from 0.5% to 10% by weight of dimethyldioctadecyl ammonium bentonite, and preferably about 0.5% to 1.0% by weight of said bentonite, and containing also at least about 2% by weight of the mineral oil soluble polyoxyethylene sorbitan monooleate, and preferably about 2½% by weight of said material, will provide an ointment base having the most desirable properties.

The composition of this invention may be adjusted to any particular concentration of thiobarbiturate which will be most suited to an individual problem of administration, and preferably at least about 2% w./v. of said composition. Considering a cubic centimeter of the composition as a small and convenient dosage unit, it will be apparent that any number of cubic centimeters may be measured and administered to obtain the indicated dose. Since the dose of the thiobarbiturate is measured in terms of milligrams of drug per kilogram of body weight or per pound of body weight, it is a simple matter to weigh the subject and calculate the indicated dose. In one suitable composition a 10% suspension of the thiobarbiturate in the vehicle provides 100 milligrams of drug per cubic centimeter of composition. In this composition one cubic centimeter would be used for each 5 pounds of body weight. By the use of syringe or other instrument for accurate measurement of fluids, it is easy to inject exactly the right amount of composition. The composition is administered by injecting it rectally beyond the internal sphincter.

The term anesthesia is used herein in its broadest sense and is intended to cover all degrees of anesthesia, whether first, second or third. As the term is used herein, it is intended to include the states commonly called hypnosis, analgesia, narcosis, basal hypnosis and complete anesthesia. The physician or anesthesiologist will know from experience what dose to employ in a given patient to produce any one of the states which he desires. For basal hypnosis it is generally considered that a dose in the range of 40–80 milligrams of thiobarbiturate per kilogram of body weight is suitable. This is a state frequently sought by the physician in preoperative situations where it is desirable to prevent or minimize apprehension on the part of the patient prior to taking him to the operating room.

In such a case the physician or anesthesiologist will select the dose which is indicated for basal hypnosis (about 50–60 milligrams per kilogram of body weight) and will insert such a dosage rectally. Within a few minutes the patient is either asleep or is in a very quiet state so that he does not object to being taken to the operating room where further procedures are employed. A desirable state of amnesia is also achieved.

Other important uses of the ointment and method described herein include use in a physician's office where it is necessary to induce hypnosis or at least a quiescent state in the patient before examination or procedure. Since the method is so simple it can be performed quite readily with a minimum of equipment, time and effort.

The water-soluble salts of the thiobarbiturates which are intended to be used in this invention are the sodium, potassium and calcium salts of thiopental (5-ethyl-5-(1-methylbutyl)-2-thiobarbiturate) and thiamylal (5-allyl-5-(1-methylbutyl)-2-thiobarbiturate).

The following examples are presented in order to give a complete description of the invention. It is to be understood, however, that these examples are not intended in any way to be a limitation on the invention.

*Example I*

A mastitis ointment providing a 7.5 gram dose is made up according to the following directions:

| | |
|---|---|
| Erythromycin base _____units__ | 200,000 |
| Streptomycin as sulfate _____do____ | 200,000 |
| Dimethyldioctadecyl ammonium bentonite grams__ | 0.375 |
| Polyoxyethylene sorbitan monooleate (mineral oil soluble) _____grams__ | 0.188 |
| Mineral oil medium grade viscosity U.S.P., q.s. grams__ | 7.5 |

Heat the required amount of mineral oil for about three hours at 110° C. and add the polyoxyethylene sorbitan monooleate using good agitation. Sprinkle in the dimethyldioctadecyl ammonium bentonite and continue stirring until completely dispersed. Cool the preparation below about 40° C. and add the erythromycin and the streptomycin sulfate and mix thoroughly. Mill the product through a suitable mill such as a Troy mill and fill the milled product into 7.5 gram collapsible tubes.

In this preparation the dimethyldioctadecyl ammonium bentonite is employed in a concentration of about 5% by weight, and the polyoxyethylene sorbitan monooleate is employed in a concentration of about 2½% by weight. It is possible to decrease the miscibility of this product in water by increasing the amount of the substituted bentonite up to about 10%. By reducing the amount of the substituted bentonite to about 2% by weight the product will become more miscible with water.

*Example II*

An ointment comprising a 7.5 gram dose is made up according to the following directions:

| | |
|---|---|
| Neomycin sulfate _____grams__ | 0.5 |
| Penicillin potassium _____units__ | 200,000 |
| Streptomycin as sulfate _____do____ | 200,000 |
| Dimethyldioctadecyl ammonium bentonite grams__ | 0.375 |
| Polyoxyethylene sorbitan monooleate (mineral oil soluble) _____grams__ | 0.188 |
| Mineral oil medium grade viscosity U.S.P., q.s. grams__ | 7.5 |

This preparation is made in the same way as described above in Example I. The product contains about 5% of the bentonite derivative and about 2½% by weight of the polyoxyethylene sorbitan monooleate.

*Example III*

An ointment is made into a 7.5 gram dose according to the following directions:

| | |
|---|---|
| Penicillin potassium _____units__ | 200,000 |
| Erythromycin base _____do____ | 200,000 |
| Dimethyldioctadecyl ammonium bentonite grams__ | 0.375 |
| Polyoxyethylene sorbitan monooleate (mineral oil soluble) _____grams__ | 0.188 |
| Mineral oil medium grade viscosity U.S.P., q.s. grams__ | 7.5 |

The procedure outlined in Example I is followed in making up this preparation which contains about 5% by weight of the bentonite derivative and about 2½% by weight of the polyoxyethylene sorbitan monooleate.

*Example IV*

An ointment is made up into a 7.5 gram dose according to the following directions:

| | |
|---|---|
| Sulfamilamide _____grams__ | 1.5 |
| Penicillin potassium _____units__ | 200,000 |
| Dimethyldioctadecyl ammonium bentonite grams__ | 0.375 |
| Polyoxyethylene sorbitan monooleate (mineral oil soluble) _____grams__ | 0.188 |
| Mineral oil medium grade viscosity U.S.P., q.s. _____grams__ | 7.5 |

The preparation is made according to the directions given in Example I. It contains about 5% by weight of the bentonite derivative and about 2½% by weight of the polyoxyethylene sorbitan monooleate.

*Example V*

A preparation is made up to provide a 7.5 gram dose according to the following directions:

| | |
|---|---|
| Erythromycin base _____units__ | 200,000 |
| Streptomycin as sulfate _____do____ | 200,000 |
| Dimethyldioctadecyl ammonium bentonite grams__ | 0.75 |
| Polyoxyethylene sorbitan monooleate (mineral oil soluble) _____grams__ | 0.375 |
| Mineral oil medium grade viscosity U.S.P., q.s. _____grams__ | 7.5 |

The directions given in Example I are followed in this case and preparations thus made contain about 10% by weight of the bentonite derivative and about 5% by weight of the monooleate.

*Example VI*

An ointment is prepared according to the following directions:

| | |
|---|---|
| Erythromycin base _____units__ | 200,000 |
| Streptomycin sulfate _____do____ | 200,000 |
| Dimethyldioctadecyl ammonium bentonite grams__ | 0.150 |
| Polyoxyethylene sorbitan monooleate __do____ | 0.150 |
| Mineral oil medium grade viscosity, U.S.P., q.s. _____grams__ | 7.5 |

The preparation is made up according to the Example I and it contains about 2% by weight of the bentonite derivative and about 2% by weight of the monooleate.

*Example VII*

A suspension containing 10% of thiopental sodium is made according to the following directions:

| | |
|---|---|
| Thiopental sodium, micronized _____g__ | 100 |
| Sodium carbonate _____g__ | 0.41 |
| Polyoxyethylene sorbitan monooleate (Tween 81, mineral oil soluble) _____g__ | 25.0 |
| Dimethyldioctadecyl ammonium bentonite (Bentone 34) _____g__ | 5.0 |
| Mineral oil, light, q.s. _____cc__ | 1000 |

Heat the mineral oil at 110° C. for about three hours. Discontinue heating, add the polyoxyethylene sorbitan monooleate and mix well. Add the dimethyldioctadecyl ammonium bentonite slowly and mix well. When the suspension has cooled to about 40° C., add the sodium carbonate and mix well. Then slowly add the thiopental sodium and mix well. Q.s. to full volume with the remainder of the mineral oil and transfer to a mixer and mix until a smooth suspension is obtained.

*Example VIII*

An ointment containing 10% of a thiobarbiturate is prepared according to the following directions:

| | |
|---|---|
| Thiamylal sodium g | 100.0 |
| Sodium carbonate g | 0.41 |
| Polyoxyethylene sorbitan monooleate (Tween 81, mineral oil soluble) g | 25.0 |
| Dimethyldioctadecyl ammonium bentonite (Bentone 34) g | 5.0 |
| Mineral oil, light, q.s. cc | 1000 |

The preparation is made by following the directions given in Example 1.

*Example IX*

A suitable ointment containing a thiobarbiturate is prepared according to the following directions:

| | |
|---|---|
| Thiopental sodium g | 20.0 |
| Sodium carbonate g | 0.41 |
| Polyoxyethylene sorbitan monooleate (Tween 81, mineral oil soluble) g | 20.0 |
| Dimethyldioctadecyl ammonium bentonite (Bentone 34) g | 20.0 |
| Mineral oil, light, q.s. cc | 1000 |

The preparation is compounded in accordance with the directions given in Example 1.

*Example X*

A composition for rectal use is prepared as follows:

| | |
|---|---|
| Thiopental sodium g | 200.0 |
| Tween 81 (as in preceding examples) g | 25.0 |
| Bentone 34 (as in preceding examples) g | 50.0 |
| Mineral oil, light, q.s. cc | 1000 |

Follow directions given in Example VII.

*Example XI*

A composition for rectal use is made by following the directions given in Example VII and using the following formula:

| | |
|---|---|
| Thiopental sodium g | 400.0 |
| Bentone 34 (see Example VII) g | 1.0 |
| Tween 81 (see Example VII) g | 25.0 |
| Mineral oil, light, q.s. cc | 1000 |

*Example XII*

A composition for rectal use is made by following the directions given in Example VII and using the following formula:

| | |
|---|---|
| Thiopental sodium g | 200.0 |
| Bentone 34 (see Example VII) g | 30.0 |
| Tween 81 (see Example VII) g | 25.0 |
| Mineral oil, light, q.s. cc | 1000 |

*Example XIII*

A composition for rectal use is made by following the directions given in Example VII and using the following formula:

| | |
|---|---|
| Thiopental sodium g | 400.0 |
| Bentone 34 (see Example VII) g | 5.0 |
| Tween 81 (see Example VII) g | 25.0 |
| Mineral oil, light, q.s. cc | 1000 |

The dose has been indicated as being at least about 40 milligrams of drug per kilogram of body weight for the production of anesthesia. Since it has long been customary in the use of thiobarbiturates for the physician or anesthesiologist to use only that amount of drug which is required to reach the desired degree of anesthesia, the dose may be described as one which will be sufficient to produce the desired state.

Since 20 milligrams of thiobarbiturate will be employed in the usual situation for each pound of body weight, the most desirable dosage unit will contain at least 20 milligrams of the thiobarbiturate per cubic centimeter.

This application is a continuation-in-part of my co-pending applications, Serial No. 427,651, filed May 4, 1954 and Serial No. 564,854, filed February 13, 1956, both now abandoned, as a continuation-in-part of Serial No. 427,651.

Others may practice this invention in any of the numerous ways which will be suggested to one skilled in the art. All such practice is considered to be covered by the invention provided, however, that it falls within the scope of the appended claims.

I claim:

1. An ointment base comprising a major proportion of an oil, from 0.1% to 10% by weight of an alkyl substituted ammonium bentonite gel forming agent and at least about 2% by weight of a mineral oil soluble polyoxyethylene sorbitan monooleate.

2. An ointment base comprising a major proportion of mineral oil, from 0.1% to 10% by weight of an alkyl substituted ammonium bentonite and at least about 2% by weight of a mineral oil soluble polyoxyethylene sorbitan monooleate.

3. An ointment base characterized by controlled, limited miscibility with aqueous liquids which comprises a major proportion of mineral oil, from 0.1% to 10% by weight of dimethyldioctadecyl ammonium bentonite and at least about 2% by weight of a mineral oil soluble polyoxyethylene sorbitan monooleate.

4. An ointment base characterized by controlled, limited miscibility with aqueous liquids which comprises a major proportion of a medium viscosity mineral oil, about 5% by weight of dimethyldioctadecyl ammonium bentonite and about 2½% by weight of a mineral oil soluble polyoxyethylene sorbitan monooleate.

5. An ointment comprising a medicament admixed with an ointment base which comprises a major proportion of an oil, from 0.1% to 10% by weight of an alkyl substituted ammonium bentonite gel forming agent and at least about 2% by weight of a mineral oil soluble polyoxyethylene sorbitan monooleate.

6. An ointment comprising a medicament admixed with an ointment base which comprises a major proportion of a mineral oil, from 0.1% to 10% by weight of an alkyl substituted ammonium bentonite and at least about 2% by weight of a mineral oil soluble polyoxyethylene sorbitan monooleate.

7. An ointment comprising a medicament admixed with a base which comprises a major proportion of mineral oil, from 0.1% to 10% by weight of dimethyldioctadecyl ammonium bentonite and at least about 2% by weight of mineral oil soluble polyoxyethylene sorbitan monooleate.

8. A mastitis ointment characterized by controlled, limited miscibility with aqueous liquids which comprises a medicament admixed with an ointment base comprising a major proportion of a medium viscosity mineral oil, about 5% by weight of dimethyldioctadecyl ammonium bentonite and about 2½% by weight of a mineral oil soluble polyoxyethylene sorbitan monooleate.

9. A composition for producing anesthesia which comprises an anhydrous, fluid, suspension of a water-soluble salt of a thiobarbituric acid in a fluid ointment vehicle comprising a major proportion of an oil, from 0.1% to 10% by weight of an alkyl substituted ammonium bentonite gel forming agent, and at least about 2% by weight of a mineral oil soluble polyoxyethylene sorbitan monooleate.

10. A composition for producing anesthesia which comprises an anhydrous, fluid, suspension of thiopental sodium in a fluid ointment vehicle comprising a major proportion of an oil, from about 0.1% to 10% by weight of an alkyl substituted ammonium bentonite gel forming agent, and at least about 2% by weight of a mineral oil soluble polyoxyethylene sorbitan monooleate.

11. A composition for producing anesthesia which comprises an anhydrous, fluid, suspension of at least about 2% w./v. of thiopental sodium in a fluid ointment vehicle comprising a major proportion of mineral oil, from about 0.1% to 10% by weight of dimethyldioctadecyl ammonium bentonite, and at least about 2% by weight of a mineral oil soluble polyoxyethylene sorbitan monooleate.

12. A composition comprising an anhydrous fluid suspension of a drug admixed with an ointment base which comprises a major proportion of an oil, from 0.1% to 10% by weight of an alkyl substituted ammonium bentonite gel forming agent and at least about 2% by weight of a mineral oil soluble polyoxyethylene sorbitan monooleate.

13. A method of producing anesthesia which comprises administering rectally to a human host a dose of an anhydrous, fluid, suspension containing per cubic centimeter of suspension not less than about 20 milligrams of a water-soluble salt of a thiobarbituric acid in a fluid ointment vehicle comprising a major proportion of an oil, from 0.1% to 10% by weight of an alkyl substituted ammonium bentonite and at least about 2% by weight of a mineral oil soluble polyoxyethylene sorbitan monooleate.

14. The method of producing anesthesia which comprises administering rectally to a human host not less than about 40 milligrams per kilogram of body weight of thiopental sodium suspended in a fluid ointment vehicle comprising a major proportion of an oil, from about 0.1% to 10% by weight of an alkyl substituted ammonium bentonite, and at least about 2% by weight of a mineral oil soluble polyoxyethylene sorbitan monooleate.

15. A method of producing anesthesia which comprises administering rectally to a human host not less than about 40 milligrams per kilogram of body weight of thiopental sodium suspended in a fluid ointment vehicle comprising a major proportion of a mineral oil, from about 0.1% to 10% by weight of dimethyldioctadecyl ammonium bentonite, and at least about 2% by weight of a mineral oil soluble polyoxyethylene sorbitan monooleate.

References Cited in the file of this patent

UNITED STATES PATENTS

| | | |
|---|---|---|
| 2,531,427 | Hauser | Nov. 28, 1950 |
| 2,634,244 | Simon | Apr. 7, 1953 |

OTHER REFERENCES

Spans (Spans and Tweens), Atlas Powder Co., Wilmington, Del., November 1942, esp. pp. 4 and 10.

Darlington et al., J. Am. Pharm. Assn. February 1950, pp. 82–85.

Drug and Cosmetic Emulsions, Atlas Powder Co., Wilmington, Del., 1947, pp. 4, 33, 36–38, 44 and 45.

Lesser, Drug and Cos. Ind., vol. 54, No. 4, April 1944, pp. 403, 404, 460, 461 and 480.

Vallance, Mfg. Chem., vol. 16, No. 5, May 1945, pp. 157–161.

Howard, Modern Drug Encycl., 5th ed., 1952, p. 741.